United States Patent [19]

Elfwing et al.

[11] 4,064,332

[45] Dec. 20, 1977

[54] METHOD OF MANUFACTURING A NICKEL HYDROXIDE ELECTRODE

[75] Inventors: Erik Wiktor Elfwing, Paskallavik; Lars Harry Swenne, Oskarshamn, both of Sweden

[73] Assignee: Nife Jungner AB, Sweden

[21] Appl. No.: 741,498

[22] Filed: Nov. 12, 1976

[30] Foreign Application Priority Data

Dec. 9, 1975  Sweden .................................. 7513837

[51] Int. Cl.$^2$ .............................................. H01M 4/32
[52] U.S. Cl. .................................... 429/223; 252/182.1
[58] Field of Search .................. 429/50, 223; 423/481, 423/483, 489; 252/182.1

[56] References Cited

U.S. PATENT DOCUMENTS

| | | | |
|---|---|---|---|
| 3,607,013 | 9/1971 | Saldick | 429/223 X |
| 3,653,967 | 4/1972 | Beauchamp | 429/223 X |
| 3,836,403 | 9/1974 | Gaines | 429/223 |
| 3,836,634 | 9/1974 | Saldick | 429/223 X |
| 3,911,094 | 10/1975 | Megahed et al. | 429/223 X |

*Primary Examiner*—Charles F. LeFevour
*Attorney, Agent, or Firm*—Burns, Doane, Swecker & Mathis

[57] ABSTRACT

The invention relates to a new method of manufacturing a nickel hydroxide electrode wherein the electrochemically active nickel hydroxide is formed in the pores of a nickel structure by reacting the nickel of said structure with a gas which forms a salt therewith in situ capable of reacting with an alkali metal hydroxide to form nickel hydroxide.

The invention also relates to the prepared electrode and to an alkaline storage battery containing the same as well as to the use of said electrode in an alkaline storage battery.

14 Claims, No Drawings

METHOD OF MANUFACTURING A NICKEL HYDROXIDE ELECTRODE

The present invention relates to a new method of manufacturing a nickel hydroxide electrode having a sintered nickel body or structure. The invention also relates to a nickel hydroxide electrode whenever manufactured by said new method, as well as to an alkaline storge battery containing such an electrode and to the use of such an electrode in an alkaline storage battery. Such electrodes have been known for a long time and are generally used in the electrical accumulator industry as positive electrodes in accumulators or storage batteries having an alkaline electrolyte.

The sintered nickel structure is prepared from nickel powders at high temperatures and under a gaseous atmosphere for protection against oxidation whereby the powders are sintered to a coherent, porous body of practically pure nickel. As a starting material for the sintering operation a nickel is generally used that has been prepared from carbonyl nickel; but nickel powder prepared in other ways must also be utilized, for instance by reduction of nickel oxide, by pulverization of nickel metal or by electrolysis.

Nickel hydroxide is introduced into the pores of the sintered body as an electrochemically active material. According to one known method, the active material is introduced by impregnating the sintered body with a nickel salt solution and then precipitating nickel hydroxide directly in the pores of the sintered body by polarization in hot alkali hydroxide solution. The electrode is then washed and dried. This treatment is repeated until the desired amount of active material has been incorporated. This can require 5–7 impregnations, depending on the purpose of the electrode. According toanother method, the sintered body is dipped into a melt of nickel nitrate, which is then decomposed through heating. The the sintered body is then immersed in an alkali hydroxide solution, washed and dried. This procedure is repeated several times. However, these methods are expensive and time-consuming.

It has also been proposed to obtain, the active material, wholly or partially directly from the sintered nickel structure by means of activating agents added to an impregnating solution, for instance a weakly basic solution of a metal salt with an oxidizing anion. This method is, however, associated with difficulties of having the activating solution equally distributed within the structure, which means that the latter is easily weakened. Furthermore, the method is applicable to thin electrodes only which have a maximum thickness of 1.5 mm. In the case of thicker electrodes diluted solutions must be used over extended periods rendering the method uneconomical.

The present invention relates to a new method for the manufacture of a nickel hydroxide electrode having a sintered, porous nickel structure, wherein electrochemically active material is formed in the pores by activation of nickel from the porous structure. This method comprises treating the sintered mass with a gas which forms a salt with the nickel from said structure, whereupon the salt is converted into nickel hydroxide in a manner known per se.

The preferred manner of converting the salt into nickel hydroxide is by the previously used treatment with an alkali metal hydroxide, such as sodium or potassium hydroxide Gases which are preferably for the purpose of the invention are the hydrogen halogenides and halogens, hydrogen chloride and chloring gas, in particular. Mixtures of the above-mentioned gases well as be used, as can also any gas which forms a salt with the nickel of the sintered structure, which salt can be converted into the corresponding hydroxide.

In order to accelerate the reaction it is preferable to perform the treatment with the gas at elevated temperatures, preferably at 200°–700° C.

The treatment of the sintered structure can, for example, be performed in a tube which is resistant or inert to the gases and temperatures utilized. The tube is placed in an oven and the gas is passed through the tube until most of the air has been forced out, after which the sintered structure is inserted in the tube. The time of treatment is essentially dependent on the temperature, the gas used, and on the desired amount of active material to be produced in the sintered structure.

If desired, the concentration of the reactive gas can be adjusted through admixture with aqueous steam or an inert gas, such as nitrogen gas.

The used gas is preferably circulated in a closed system.

The hydrogen gas liberated when hydrogen halogenides are used is re-converted into hydrogen halogenide by incorporating the corresponding halogen into the system.

Especially preferred embodiment of the invention will now be described in further detail in the following non-limiting examples.

EXAMPLE 1

A sintered body, prepared from carbonyl nickel powder, had a thickness of 4.6 mm, a diameter of 9.9 mm and a weight of 0.80 g. It was put into a quartz tube which had been placed in an oven; but not until most of the air had been driven out of the tube by passing dry HCl-gas through the same. The temperature of the oven was maintained at about 500° C. Dry HCl-gas was continuously pass through the tube in a stoichiometric excess with respect to the amount of nickel in the structure. After 1 hour the weight of the sintered body had increased to 1.04 g, indicating that 0.44 g of nickel chloride had been formed, equivalent to 42% of the total weight of the sintered body. The sintered structure was then immersed into 4.3 M potassium hydroxide solution at room temperature and the nickel chloride which was present in the pores was thereby converted into 0.31 g of nickel hydroxide. The time of treatment in the potassium hydroxide was about 24 hours with two changes of lye during said time. The manufactured sintered electrode was now cycled with a charging current of 10 mA for 15 hours and discharged at 17 mA. After 5 cycles the electrode had an electrochemical capacity of 24 Ah calculated per 100 g of nickel hydroxide, which is a good result. The strength of the sintered body was satisfactory.

EXAMPLE 2

A sintered body of the same type as in Example 1, having a thickness of 3.1 mm, a diameter of 15 mm and a weight of 0.94 g. was treated as in Example 1, but with chlorine gas instead of HCl-gas. The temperature of the oven was maintained at about 500° C. After 1 hour the weight of the sintered body had increased to 1.39 g, indicating that 0.83 g of nickel chloride had been formed, equivalent to 60% of the total weight of the sintered body. After a treatment with potassium hydroxide solution the strength of the sintered body was, in the case, also satisfactory.

EXAMPLE 3

A sintered body of the same type as in Example 1, having a thickness of 2.8 mm, a diameter of 15 mm and a weight of 1.24 g. was treated with HCl-gas in an oven at 250° C in the same way as in Example 1. After 1 hour the weight of the sintered body had increased to 1.32 g, indicating that 0.14 g of nickel chloride had been formed equivalent to 11% of the total weight of the sintered body. After a total of 4 hours of treatment, the weight of the sintered body had increased to 1.55 g, indicating that 0.56 g of nickel chloride had been formed, equivalent to 36% of the total weight of the sintered body.

The above-mentioned examples show that by choice of temperature and time of treatment, as well as of gas, the attack on the sintered structure can be varied. In this way it is possible to conveniently adapt the process to the structure and the dimensions of the sintered body. Without being bound by the correctness of the explanation, it is believed that the good results obtained with the method of the present invention stem from a better distribution of gases within the pores of the sintered body than is possible with the prior activating solutions. Furthermore, the present method makes it possible to obtain a good and homogeneous activation of thin, as well as relatively thick electrodes.

What is claimed is:

1. In the method of manufacturing a nickel hydroxide electrode having a sintered, porous nickel structure by forming electrochemically active material in the pores of the structure through activation of nickel from the structure, the improvement which comprises reacting the nickel of the structure with a gas which forms a nickel salt in situ capable of reacting with an alkali metal hydroxide to form nickel hydroxide and then reacting said salt with an alkali metal hydroxide to form nickel hydroxide in the pores of the nickel of said structure.

2. The method as claimed in claim 1, wherein the gas is a hydrogen halogenide.

3. The method as claimed in claim 1, wherein the gas is a halogen.

4. The method as claimed in claim 1, wherein the treatment is performed at elevated temperatures.

5. The method as claimed in claim 1, wherein the treatment is performed in a tube which is resistant to the gas and temperature used.

6. The method as claimed in claim 1 wherein the concentration of the gas used at the treatment is adjusted by incorporating a gaseous substance selected from the group consisting of aqueous steam and inert gases.

7. The method as claimed in claim 2, wherein the gas is hydrogen chloride.

8. The method as claimed in claim 3, wherein the gas is chlorine.

9. The method as claimed in claim 4, wherein the treatment is performed at a temperature within the range of 200–700° C.

10. The method as claimed in claim 5, wherein the used gas is recycled in a closed system.

11. The method as claimed in claim 10, wherein a hydrogen halogenide is used and wherein hydrogen liberated during the treatment is reconverted into hydrogen halogenide by incorporating the appropriate halogen into the system.

12. The method as claimed in claim 6, wherein the inert gas is nitrogen.

13. A porous nickel hydroxide electrode produced by reacting a sintered, porous nickel structure with a gas which forms a nickel salt in situ capable of reacting with an alkali metal hydroxide to form nickel hydroxide, then reacting said salt with an alkali metal hydroxide to form a porous nickel hydroxide structure, all of the nickel hydroxide in said porous nickel hydroxide structure having been formed from the nickel in said sintered, porous nickel structure, and then forming said porous nickel hydroxide structure into an electrode.

14. An alkaline storage battery comprising at least one nickel hydroxide electrode of claim 13.

* * * * *